(12) United States Patent
Han

(10) Patent No.: US 11,105,237 B2
(45) Date of Patent: Aug. 31, 2021

(54) VEHICLE AFTERTREATMENT SYSTEM ENABLING THE CHANGE IN THE SEQUENCE OF OPERATING AFTERTREATMENT DEVICES

(71) Applicants: HYUNDAI MOTOR COMPANY, Seoul (KR); KIA MOTORS CORPORATION, Seoul (KR)

(72) Inventor: Kyoung Chan Han, Gunpo-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 159 days.

(21) Appl. No.: 16/514,085

(22) Filed: Jul. 17, 2019

(65) Prior Publication Data

US 2020/0271030 A1 Aug. 27, 2020

(30) Foreign Application Priority Data

Feb. 27, 2019 (KR) .................. 10-2019-0022861

(51) Int. Cl.
| | |
|---|---|
| *F01N 3/035* | (2006.01) |
| *F01N 3/28* | (2006.01) |
| *F01N 3/08* | (2006.01) |
| *F01N 13/00* | (2010.01) |
| *F01N 3/20* | (2006.01) |
| *F01N 3/021* | (2006.01) |
| *B01D 53/94* | (2006.01) |

(52) U.S. Cl.
CPC ......... *F01N 3/035* (2013.01); *B01D 53/9459* (2013.01); *F01N 3/021* (2013.01); *F01N 3/0814* (2013.01); *F01N 3/0842* (2013.01); *F01N 3/2066* (2013.01); *F01N 3/2892* (2013.01); *F01N 13/0097* (2014.06); *F01N 13/017* (2014.06)

(58) Field of Classification Search
CPC .. F01N 13/009; F01N 13/0097; F01N 13/011; F01N 13/017; F01N 3/2885
See application file for complete search history.

(56) References Cited

U.S. PATENT DOCUMENTS

| | | | | |
|---|---|---|---|---|
| 4,404,798 | A | * | 9/1983 | Takagi ................. F01N 3/0211 55/282 |
| 2006/0260296 | A1 | * | 11/2006 | Theis ...................... F01N 3/206 60/286 |

(Continued)

FOREIGN PATENT DOCUMENTS

| | | | | |
|---|---|---|---|---|
| CN | 102116187 A | * | 7/2011 | |
| DE | 102016210541 A1 | * | 12/2017 | ............. F01N 3/035 |

(Continued)

*Primary Examiner* — Laert Dounis

(57) ABSTRACT

A vehicle engine aftertreatment system includes: a purification module including a plurality of aftertreatment devices having different characteristics, the aftertreatment devices being arranged in parallel; an upstream selection device provided at one side of the purification module for selectively supplying exhaust gas from an engine to one of the aftertreatment devices; and a downstream selection device provided at the other side of the purification module for discharging exhaust gas from one of the aftertreatment devices to out of the purification module.

9 Claims, 4 Drawing Sheets

(56) References Cited

U.S. PATENT DOCUMENTS

| | | | | |
|---|---|---|---|---|
| 2010/0089034 A1* | 4/2010 | Harmsen | ............ | B01D 53/9431 |
| | | | | 60/276 |
| 2012/0186228 A1* | 7/2012 | Yacoub | ................... | F01N 9/002 |
| | | | | 60/274 |
| 2017/0335738 A1* | 11/2017 | Garnemark | ............. | F01N 3/032 |
| 2018/0023450 A1* | 1/2018 | Zhang | ....................... | F01N 9/00 |
| | | | | 60/602 |

FOREIGN PATENT DOCUMENTS

| | | | | | |
|---|---|---|---|---|---|
| EP | | 2113644 A2 * | 11/2009 | ........... | F01N 13/009 |
| JP | | 59101521 A * | 6/1984 | ............ | F01N 3/025 |
| KR | 10-2012-0012608 | | 2/2012 | | |
| WO | WO-2015015619 A1 * | | 2/2015 | ........... | F01N 13/017 |

* cited by examiner

VEHICLE AFTERTREATMENT SYSTEM ENABLING THE CHANGE IN THE SEQUENCE OF OPERATING AFTERTREATMENT DEVICES

CROSS-REFERENCE TO RELATED APPLICATION

This application claims priority to and the benefit of Korean Patent Application No. 10-2019-0022861, filed on Feb. 27, 2019, the entire contents of which are incorporated herein by reference.

FIELD

The present disclosure relates to an engine aftertreatment system for purifying exhaust gas emitted from a vehicle.

BACKGROUND

The statements in this section merely provide background information related to the present disclosure and may not constitute prior art.

Exhaust gas from the engine of a vehicle includes toxic materials, which must be appropriately removed before being discharged into the atmosphere. Various kinds of devices, such as catalysts, are used to purify or remove such toxic materials. In recent years, a plurality of devices is used in combination, instead of a single device, in order to deal with exhaust gas regulations, which have become increasingly stringent.

A plurality of aftertreatment devices is sequentially arranged along the flow path of exhaust gas from the engine. For example, a lean NOx trap (LNT), a diesel particulate filter (DPF), and a selective catalytic reducer (SCR) are sequentially arranged such that exhaust gas from the engine sequentially passes through the LNT, DPF, and SCR, whereby toxic materials are removed and are then discharged to the atmosphere.

Since the LNT is located upstream of other devices, the activation of the LNT is achieved within a relatively short time; however, NOx absorbed by the LNT may slip, or the LNT may be deteriorated (damaged) when the catalyst temperature increases.

When a predetermined amount of soot is collected by the DPF, the temperature of the DPF must be increased in order to regenerate the DPF. If the temperature of the DPF is not sufficiently increased, the DPF may be damaged or the engine may break down.

Since the SCR is located downstream of other devices, a relatively long time is required to achieve the activation of the SCR. As a result, the purification performance of the SCR is not sufficiently exhibited before the activation of the SCR. Meanwhile, if the temperature of the SCR excessively increases, ammonia slip may occur.

In addition to the LNT, DPF, and SCR, a diesel oxidation catalyst (DOC) is used as one of the engine aftertreatment devices. Furthermore, various complex devices having combined functions, such as a SCR-coated DPF (SDPF), are also used.

The characteristics of the engine aftertreatment devices described above are different from each other. For example, the activation temperatures of the engine aftertreatment devices are different from each other, the times desired for the engine aftertreatment devices to reach their activation temperatures are different from each other, the activation priorities of the engine aftertreatment devices are different from each other, the operation temperatures of the engine aftertreatment devices are different from each other, and the temperatures desired for the engine aftertreatment devices to be regenerated are different from each other. Furthermore, the points of time at which these characteristics are required are different from each other. We have discovered that since the aftertreatment devices are fixedly arranged in the predetermined sequence along the flow path of exhaust gas, as described above, it is not possible to appropriately respond to the operation state of the engine and the individual requirements of each aftertreatment device.

The matters disclosed in this section are merely for enhancement of understanding of the general background of the present disclosure and should not be taken as an acknowledgment or any form of suggestion that the matters form the related art already known to a person skilled in the art.

SUMMARY

The present disclosure provides a vehicle engine aftertreatment system that is capable of changing the sequence in the flow of exhaust gas that passes through aftertreatment devices depending on the operation state of an engine and the state of each aftertreatment device such that the aftertreatment devices can be used in a more suitable state, whereby it is possible to further improve the performance of removing toxic materials from the exhaust gas and thus purifying the exhaust gas and to greatly improve the durability of each aftertreatment device.

In accordance with an aspect of the present disclosure, a vehicle engine aftertreatment system includes: a purification module including a plurality of aftertreatment devices having different characteristics, the plurality of aftertreatment devices being arranged in parallel, an upstream selection device provided at one side of the purification module and configured to selectively supply exhaust gas from an engine to at least one aftertreatment device of the plurality of aftertreatment devices, and a downstream selection device provided at another side of the purification module and configured to discharge exhaust gas from the at least one aftertreatment device to out of the purification module.

The aftertreatment devices of the plurality of aftertreatment devices may be arranged at the same interval in the circumferential direction of a circle surrounding an imaginary center line connecting opposite sides of the purification module.

The purification module may include a cylindrical module case, in which the aftertreatment devices are arranged.

The upstream selection device may include an upstream shell rotatably mounted to the cylindrical module case and configured to surround one side of the cylindrical module case, and an upstream selection pipe. In particular, the upstream selection pipe includes one end extending through the upstream shell and configured to be rotatably connected to an upstream exhaust pipe configured to provide exhaust gas from the engine, and another end configured to communicate with the at least one aftertreatment device among the plurality of aftertreatment devices as the upstream shell is rotated.

The upstream shell may define therein a space in which among the plurality of aftertreatment devices, other aftertreatment devices, excluding the at least one aftertreatment device communicating with the upstream selection pipe, communicate with each other.

The downstream selection device may include: a downstream shell rotatably mounted to the cylindrical module case and configured to surround the another side of the cylindrical module case; and a downstream selection pipe. The downstream selection pipe includes: one end configured to communicate with at least one aftertreatment device among the plurality of aftertreatment devices as the downstream shell is rotated, and another end extending through the downstream shell and configured to be rotatably connected to an downstream exhaust pipe configured to discharge exhaust gas to the atmosphere.

The downstream shell may define therein a space in which the other aftertreatment devices among the plurality of aftertreatment devices, excluding the aftertreatment device communicating with the downstream selection pipe, communicate with each other.

Three aftertreatment devices of the plurality of aftertreatment devices may be arranged in parallel at the same interval while forming a circle in the cylindrical module case.

The three aftertreatment devices may include at least one of a lean NOx trap (LNT), a diesel particulate filter (DPF), or a selective catalytic reducer (SCR).

The three aftertreatment devices may be the LNT, DPF, and SCR, and the vehicle engine aftertreatment system may further include an upstream driving motor for rotating the upstream shell relative to the cylindrical module case, a downstream driving motor for rotating the downstream shell relative to the cylindrical module case, and a controller for controlling the upstream driving motor and the downstream driving motor based on the operation state of the engine and the state of each aftertreatment device.

In accordance with another aspect of the present disclosure, there is provided a method of controlling the vehicle engine aftertreatment system, configured as described above, the method including, in the state in which a plurality of conditions set depending on the operation state of the engine and the state of each aftertreatment device of the plurality of aftertreatment devices, the priority of the conditions, and the connection sequence of the aftertreatment devices in each condition are predetermined, the controller sequentially determining whether the conditions are satisfied based on the condition having the lowest priority depending on the current operation state of the engine and the current state of each aftertreatment device, and, upon determining that one of the conditions is satisfied, updating the connection sequence of the aftertreatment devices in the condition (a sequence setting step), and controlling the upstream driving motor and the downstream driving motor according to the connection sequence of the aftertreatment devices finally set at the sequence setting step in order to adjust the connection sequence of the aftertreatment devices (a sequence adjustment step).

The controller may control the upstream driving motor and the downstream driving motor such that among the plurality of aftertreatment devices, the aftertreatment device connected to the upstream selection pipe of the upstream selection device and the aftertreatment device connected to the downstream selection pipe of the downstream selection device are not the same.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
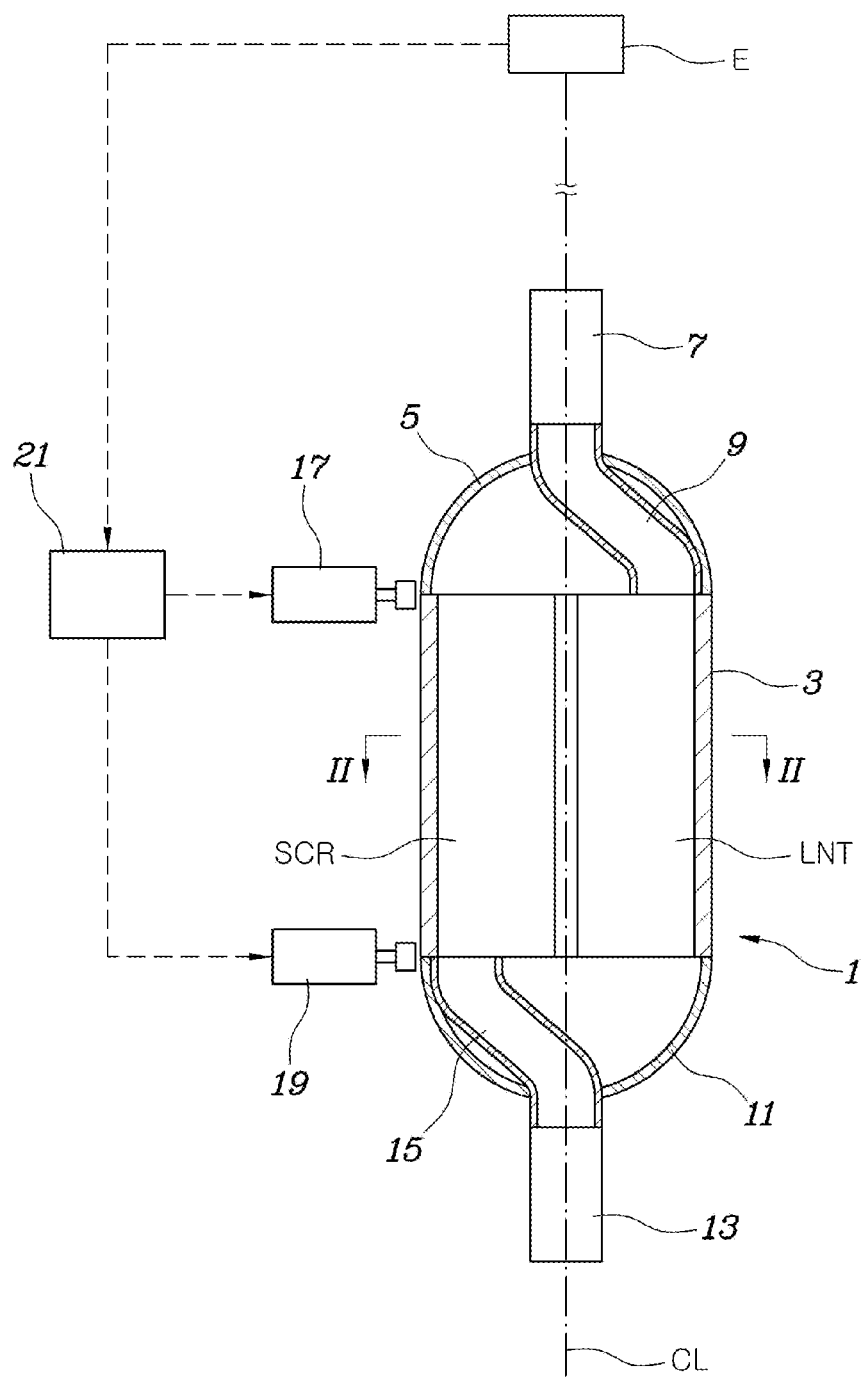
FIG. 1 is a view illustrating a vehicle engine aftertreatment system according to one form present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
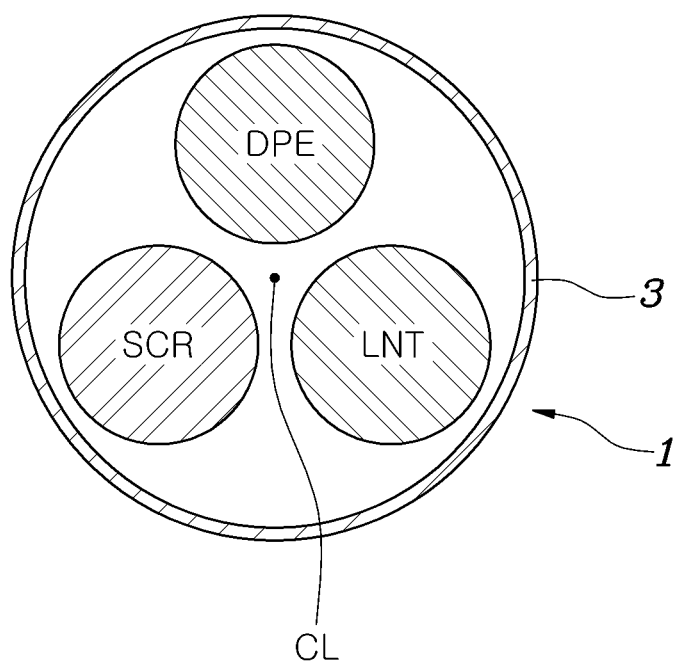
FIG. 2 is a sectional view taken along line II-II of FIG. 1.
Figure 3:
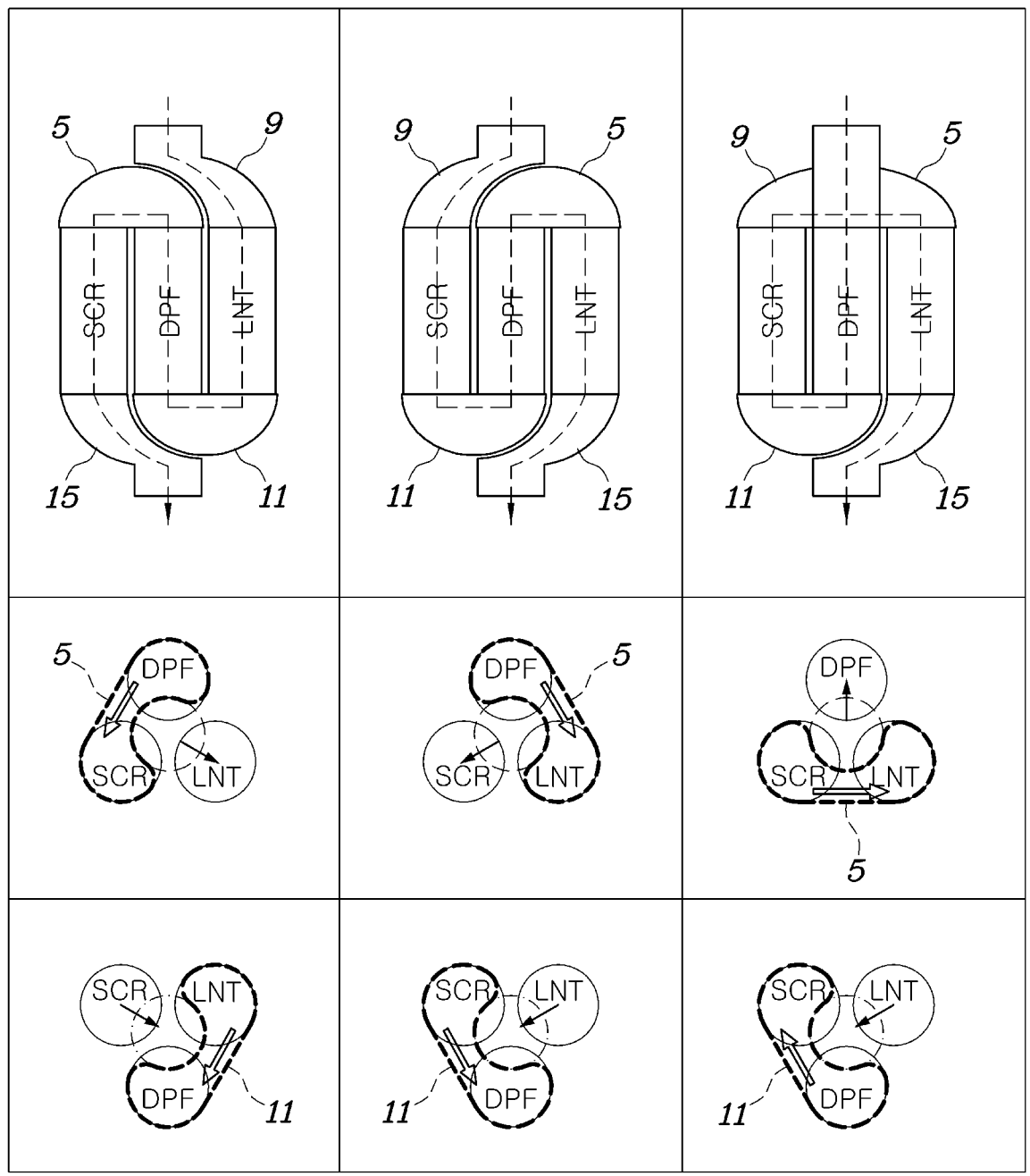
FIG. 3 is a diagram illustrating three connection sequences that can be controlled by the form of FIG. 1.

Referring to FIGS. 1 to 3, a vehicle engine aftertreatment system according to an exemplary form of the present disclosure includes: a purification module 1 constituted by a plurality of aftertreatment devices having different characteristics, the aftertreatment devices being arranged in parallel, an upstream selection device provided at one side of the purification module 1 for selectively supplying exhaust gas from an engine E to one of the aftertreatment devices, and a downstream selection device provided at the other side of the purification module 1 for discharging exhaust gas from one of the aftertreatment devices out of the purification module 1.

That is, the vehicle engine aftertreatment system is configured such that aftertreatment devices, such as LNT, DPF, and SCR, are arranged in parallel to constitute the purification module 1, such that exhaust gas is supplied to one of the aftertreatment devices through the upstream selection device, and such that exhaust gas from one of the other aftertreatment devices is discharged out of the purification module 1 through the downstream selection device, whereby the sequence of the aftertreatment devices, through which the exhaust gas passes, is changed according to the selection of the upstream selection device and the downstream selection device.

The aftertreatment devices constituting the purification module 1 are arranged at the same interval in the circumferential direction of a circle surrounding an imaginary center line CL connecting opposite sides of the purification module 1.

The purification module 1 includes a cylindrical module case 3, in which the aftertreatment devices are mounted.

That is, the purification module 1 is configured such that the aftertreatment devices are fixed at the same interval while forming a circle in the module case 3. The module case 3 is fixed to the body of a vehicle.

The upstream selection device includes an upstream shell 5 rotatably mounted to the module case 3 while surrounding one side of the module case 3 and an upstream selection pipe 9 having one end extending through the upstream shell 5 so as to be rotatably connected to an upstream exhaust pipe 7 configured to provide exhaust gas from the engine and the other end formed so as to communicate with one of the aftertreatment devices as the upstream shell 5 is rotated.

Consequently, the upstream exhaust pipe 7 and the module case 3 are coaxially fixed to the body of the vehicle.

That is, the upstream shell 5 is configured to be rotated relative to the upstream exhaust pipe 7 and the module case 3, which are coaxially arranged, about the same axis as the upstream exhaust pipe 7 and the module case 3 therebetween such that exhaust gas from the upstream exhaust pipe 7 is selectively supplied to one of the aftertreatment devices through the upstream selection pipe 9.

The upstream shell 5 defines therein a space in which the other aftertreatment devices, excluding the aftertreatment device communicating with the upstream selection pipe 9, communicate with each other.

That is, the other aftertreatment devices, excluding the aftertreatment device communicating with the upstream selection pipe 9, communicate with each other in the space defined in the upstream shell 5. As a result, the space in the upstream shell 5 serves as a connection path between the other aftertreatment devices.

The downstream selection device includes a downstream shell 11 rotatably mounted to the module case 3 while surrounding the other side of the module case 3 and a downstream selection pipe 15 having one end formed so as to communicate with one of the aftertreatment devices as the downstream shell 11 is rotated and the other end extending through the downstream shell 11 so as to be rotatably connected to an downstream exhaust pipe 13 configured to discharge exhaust gas to the atmosphere.

Consequently, the downstream exhaust pipe 13 and the module case 3 are coaxially fixed to the body of the vehicle.

That is, the downstream shell 11 is configured to be rotated relative to the module case 3 and the downstream exhaust pipe 13, which are coaxially arranged, about the same axis as the module case 3 and the downstream exhaust pipe 13 therebetween such that exhaust gas from one of the aftertreatment devices in the module case 3 is discharged to the downstream exhaust pipe 13 through the downstream selection pipe 15.

The downstream shell 11 defines therein a space in which the other aftertreatment devices, excluding the aftertreatment device communicating with the downstream selection pipe 15, communicate with each other, and therefore the space in the downstream shell 11 serves as a connection path between the other aftertreatment devices.

In this form, three aftertreatment devices are arranged in parallel at the same interval while forming a circle in the module case 3.

The three aftertreatment devices may include at least one of an LNT, a DPF, or an SCR. In this form, the three aftertreatment devices are an LNT, a DPF, and an SCR.

The upstream selection device includes an upstream driving motor 17 for rotating the upstream shell 5 relative to the module case 3, and the downstream selection device includes a downstream driving motor 19 for rotating the downstream shell 11 relative to the module case 3. The upstream driving motor and the downstream driving motor 19 are connected to a controller 21, which controls the upstream driving motor 17 and the downstream driving motor 19 in consideration of the operation state of the engine and the state of each aftertreatment device.

FIG. 3 illustrates examples of the connection sequences of aftertreatment devices that can be selected as the upstream shell 5 and the downstream shell 11 are rotated about the module case 3 of the purification module 1. The upper part of the figure illustrates the channel for exhaust gas defined according to each connection sequence in a plan view, the middle part of the figure illustrates the flow of exhaust gas when viewed from the upstream shell 5, and the lower part of the figure illustrates the flow of exhaust gas when viewed from the downstream shell 11.

For example, in the leftmost column, the upstream shell 5 is rotated such that the upstream selection pipe 9 communicates with the LNT, and the downstream shell 11 is rotated such that the downstream selection pipe 15 communicates with the SCR, wherein exhaust gas introduced into the upstream selection pipe 9 from the engine through the upstream exhaust pipe 7 is purified while sequentially passing through the LNT, DPF, and SCR and is then discharged to the downstream exhaust pipe 13 through the downstream selection pipe 15.

Figure 4:
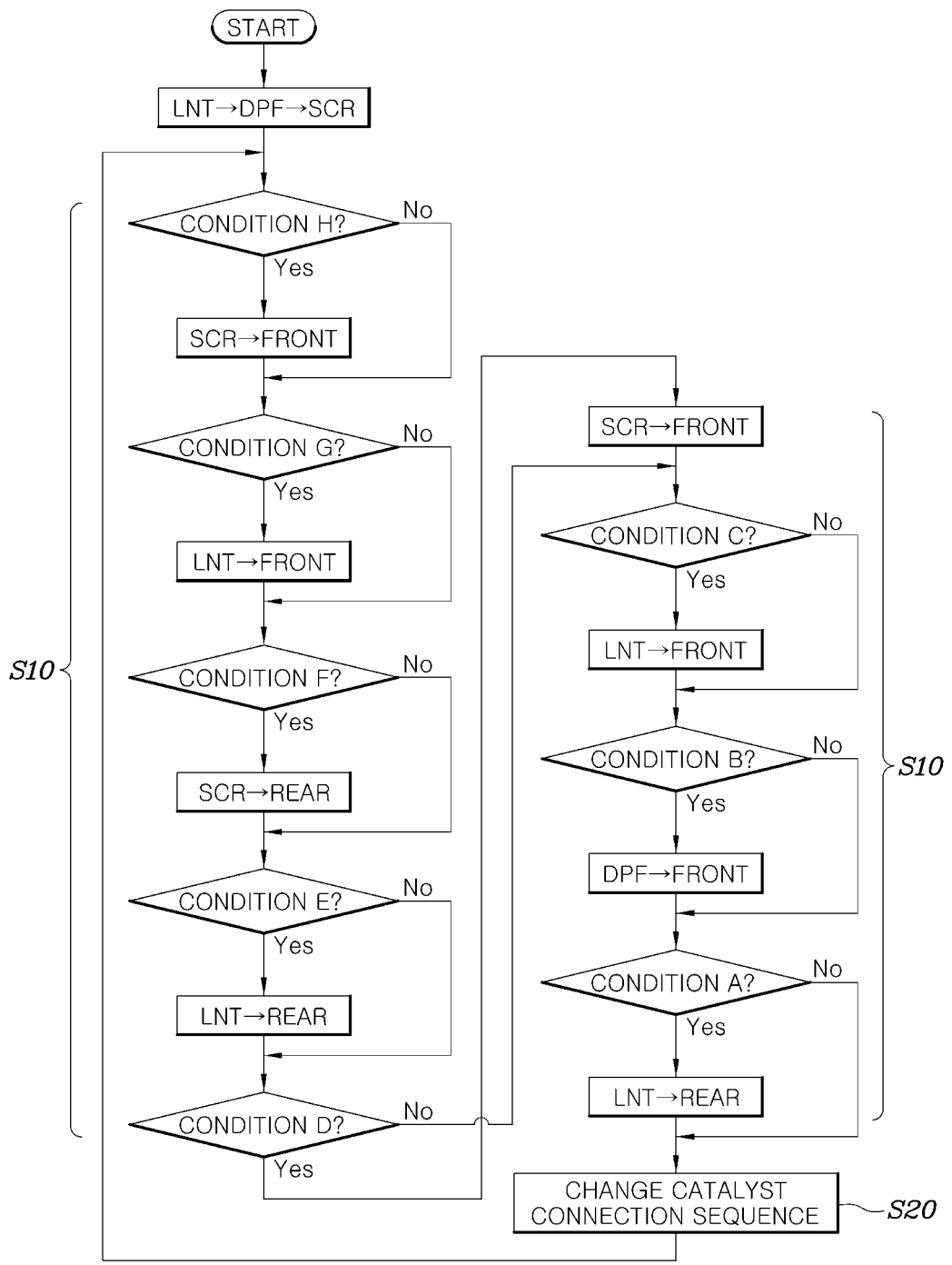
FIG. 4 is a flowchart showing a method of controlling a vehicle engine aftertreatment system according to one form of the present disclosure.

As shown in FIG. 4, a method of controlling the vehicle engine aftertreatment system, configured as described above, includes, in the state in which a plurality of conditions set depending on the operation state of the engine and the state of each aftertreatment device, the priority of the conditions, and the connection sequence of the aftertreatment devices in each condition are predetermined, a sequence setting step (S10) of the controller 21 sequentially determining whether the conditions are satisfied beginning with the condition having the lowest priority depending on the current operation state of the engine and the current state of each aftertreatment device, and, upon determining that one of the conditions is satisfied, updating the connection sequence of the aftertreatment devices in the condition, and a sequence adjustment step (S20) of controlling the upstream driving motor and the downstream driving motor 19 according to the connection sequence of the aftertreatment devices finally set at the sequence setting step (S10) in order to adjust the connection sequence of the aftertreatment devices.

That is, the controller 21 determines a plurality of predetermined conditions depending on the operation state of the engine and the state of each aftertreatment device, finally sets the connection sequence of the aftertreatment devices of the purification module 1, and controls the upstream driving motor 17 and the downstream driving motor 19 in order to rotate the upstream shell 5 and the downstream shell 11, respectively, such that the aftertreatment devices are connected according to the connection sequence. Consequently, the connection sequence of the aftertreatment devices is actively set in a timely manner depending on the operation state of the engine and the state of each aftertreatment device such that the aftertreatment devices can be used in a more suitable state, whereby it is possible to further improve the performance of removing toxic materials from the exhaust gas and thus purifying the exhaust gas and to greatly improve the durability of each aftertreatment device.

Since whether the conditions are satisfied is determined beginning with the condition having the lowest priority, as described above, the connection sequence of the aftertreatment devices that is more suitable for the condition having higher priority is set.

In most cases, in the above control method, the controller 21 controls the upstream driving motor 17 and the downstream driving motor 19 such that the aftertreatment device connected to the upstream selection pipe 9 of the upstream selection device and the aftertreatment device connected to the downstream selection pipe 15 of the downstream selection device are not the same.

That is, the aftertreatment device connected to the upstream selection pipe 9 is a device through which exhaust gas from the engine initially passes, and the aftertreatment device connected to the downstream selection pipe 15 is a device through which exhaust gas from the engine finally passes. If these two aftertreatment devices are the same, therefore, the exhaust gas passes through only one of the aftertreatment devices and is then discharged to the outside.

Of course, there may be a situation in which it is intended to pass the exhaust gas through only a single aftertreatment device, as described above, depending on the circumstances or as needed.

In most cases, however, the aftertreatment device connected to the upstream selection pipe 9 and the aftertreatment device connected to the downstream selection pipe 15 are different from each other, as described above. Consequently, in the case in which the purification module 1 includes three aftertreatment devices, as in this form, the exhaust gas sequentially passes through the aftertreatment device connected to the upstream selection pipe 9, the aftertreatment device connected neither to the upstream selection pipe 9 nor to the downstream selection pipe 15, and the aftertreatment device connected to the downstream selection pipe 15.

In FIG. 4, condition A is an LNT catalyst protection condition, which is satisfied in the case in which the temperature of the LNT is a predetermined level or higher and thus it is desired to protect the LNT. In this case, the connection sequence of the aftertreatment devices is set such that the LNT is disposed at the rear.

For reference, "disposed at the rear" means communication with the downstream selection pipe 15, and "disposed in front", which will be described below, means communication with the upstream selection pipe 9.

Condition B is a DPF regeneration condition, which is satisfied in the case in which it is determined that it is desired to regenerate the DPF, in the same manner as in a conventional method. In this case, the connection sequence of the aftertreatment devices is set such that the DPF is disposed in front.

Condition C is an LNT temperature increase condition, which is satisfied in the case in which it is desired to increase the temperature of the LNT. In this case, the LNT is disposed in front.

Condition D is an LNT absorption and SCR temperature increase condition, which is satisfied in the case in which LNT absorption is possible and it is desired to increase the temperature of the SCR. In this case, the SCR is disposed in front.

Condition E is an LNT absorption quantity condition, which is satisfied in the case in which it is determined that the LNT absorption quantity is a predetermined level or higher and thus it is expected to be difficult to absorb nitrogen oxide. In this case, the LNT is disposed at the rear.

Condition F is an SCR ammonia absorption quantity condition, which is satisfied in the case in which the SCR absorbs a predetermined amount of ammonia and thus the possibility of slippage of ammonia is expected. In this case, the SCR is disposed at the rear.

Condition G is an LNT regeneration condition, which is satisfied in the case in which it is determined that it is desired to regenerate the LNT. In this case, the LNT is disposed in front.

Condition H is an SCR regeneration condition, which is satisfied in the case in which it is determined that it is desired to regenerate the SCR. In this case, the SCR is disposed in front.

A method of determining whether each condition is satisfied may be performed using conventional technology, and the priority of the above conditions is A>B>C>D>E>F>G>H.

As is apparent from the above description, the present disclosure has effects in that it is possible to change the sequence of the flow of exhaust gas that passes through the aftertreatment devices depending on the operation state of the engine and the state of each aftertreatment device such that the aftertreatment devices can be used in a more suitable state, whereby it is possible to further improve the performance of removing toxic materials from the exhaust gas and thus purifying the exhaust gas and to greatly improve the durability of each aftertreatment device.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. A vehicle engine aftertreatent system, comprising:
   a purification module including:
      a plurality of aftertreatment devices having different characteristics,
      a cylindrical module case in which the plurality of aftertreatment devices are arranged;
   an upstream selection device provided at one side of the purification module and configured to selectively supply exhaust gas from an engine to at least one aftertreatment device of the plurality of aftertreatment devices; and
   a downstream selection device provided at another side of the purification module and configured to discharge exhaust gas from the at least one aftertreatment device to out of the purification module,
   wherein aftertreatment devices of the plurality of aftertreatment devices are arranged at a same interval in a circumferential direction of a circle surrounding an imaginary center line connecting opposite sides of the purification module, and
   wherein the upstream selection device comprises:
      an upstream shell rotatably mounted to the cylindrical module case and configured to surround one side of the cylindrical module case; and
      an upstream selection pipe having:
         one end extending through the upstream shell and configured to be rotatably connected to an upstream exhaust pipe configured to provide exhaust gas from the engine, and
         another end configured to communicate with the at least one aftertreatment device among the plurality of aftertreatment devices as the upstream shell is rotated.

2. The vehicle engine aftertreatment system according to claim 1, wherein the upstream shell defines therein a space in which among the plurality of aftertreatment devices, other aftertreatment devices, excluding the at least one aftertreatment device communicating with the upstream selection pipe, communicate with each other.

3. The vehicle engine aftertreatment system according to claim 1, wherein the downstream selection device comprises:
   a downstream shell rotatably mounted to the cylindrical module case and configured to surround the another side of the cylindrical module case; and
   a downstream selection pipe having:
      one end configured to communicate with at least one aftertreatment device among the plurality of aftertreatment devices as the downstream shell is rotated, and
      another end extending through the downstream shell and configured to be rotatably connected to an downstream exhaust pipe configured to discharge exhaust gas to an atmosphere.

4. The vehicle engine aftertreatment system according to claim 3, wherein the downstream shell defines therein a space in which other aftertreatment devices among the plurality of aftertreatment devices, excluding the at least one aftertreatment device communicating with the downstream selection pipe, communicate with each other.

5. The vehicle engine aftertreatment system according to claim 1, wherein the aftertreatment devices of the plurality of aftertreatment devices includes three aftertreatment devices, and the exhaust gas supplied from the upstream selection device sequentially flow along the three aftertreatment devices according to a predetermined order.

6. The vehicle engine aftertreatment system according to claim 5, wherein the three aftertreatment devices comprise at least one of a lean NOx trap (LNT), a diesel particulate filter (DPF), or a selective catalytic reducer (SCR).

7. The vehicle engine aftertreatment system according to claim 1, further comprising:
    an upstream driving motor configured to rotate the upstream shell relative to the cylindrical module case;
    a downstream driving motor configured to rotate a downstream shell relative to the cylindrical module case; and
    a controller configured to control the upstream driving motor and the downstream driving motor based on an operation state of the engine and a state of each aftertreatment device of the plurality of aftertreatment devices,
    wherein the aftertreatment devices include a lean NOx trap (LNT), a diesel particulate filter (DPF), and a selective catalytic reducer (SCR).

8. A method of controlling the vehicle engine aftertreatment system according to claim 7, the method comprising:
    in a state in which a plurality of conditions set depending on the operation state of the engine and the state of each aftertreatment device of the plurality of aftertreatment devices, a priority of the conditions, and a connection sequence of the aftertreatment devices in each condition are predetermined,
    the controller is configured to:
        sequentially determine whether the conditions are satisfied based on a condition having a lowest priority depending on a current operation state of the engine and a current state of each aftertreatment device, and, upon determining that one of the conditions is satisfied, update the connection sequence of the aftertreatment devices in the condition (a sequence setting step); and
    control the upstream driving motor and the downstream driving motor based on the connection sequence of the aftertreatment devices finally set at the sequence setting step so as to adjust the connection sequence of the aftertreatment devices (a sequence adjustment step).

9. The method according to claim 8, wherein the controller is configured to control the upstream driving motor and the downstream driving motor such that among the plurality of aftertreatment devices, a aftertreatment device connected to an upstream selection pipe of the upstream selection device and another aftertreatment device connected to a downstream selection pipe of the downstream selection device are different.

* * * * *